US006632308B1

United States Patent
Yovichin

(10) Patent No.: US 6,632,308 B1
(45) Date of Patent: Oct. 14, 2003

(54) CONTINUOUS CURED INNERLINER FOR TIRES

(75) Inventor: Albert James Yovichin, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/831,815

(22) PCT Filed: Nov. 24, 1999

(86) PCT No.: PCT/US99/27840

§ 371 (c)(1),
(2), (4) Date: May 14, 2001

(87) PCT Pub. No.: WO00/30839

PCT Pub. Date: Jun. 2, 2000

(51) Int. Cl.⁷ ................................................ B29D 30/16
(52) U.S. Cl. .................... 156/123; 156/130.5; 156/133; 156/134
(58) Field of Search ............. 156/123, 130.5, 156/130.7, 133, 134, 110.1, 218, 307.1; 152/510

(56) References Cited

U.S. PATENT DOCUMENTS

| | | | | |
|---|---|---|---|---|
| 2,688,996 A | * | 9/1954 | Loomis | 156/134 |
| 3,027,289 A | | 3/1962 | Gitzinger | 156/132 |
| 3,933,553 A | | 1/1976 | Seiberling | 156/123 |
| 4,166,883 A | | 9/1979 | Seiberling | 428/495 |
| 4,443,279 A | | 4/1984 | Sandstrom | 156/123 |
| 4,680,071 A | * | 7/1987 | Candle | 156/218 |
| 4,776,909 A | | 10/1988 | Bohm et al. | 156/117 |
| 5,961,913 A | | 10/1999 | Haase | 264/326 |
| 6,291,542 B1 | * | 9/2001 | Hubbard et al. | 522/158 |

FOREIGN PATENT DOCUMENTS

| | | |
|---|---|---|
| DK | 355909 C | 7/1922 |
| DK | 4434270 | 3/1996 |
| FR | 2526707 | 11/1983 |
| GB | 996385 A | 6/1965 |
| GB | 2224031 | 4/1990 |
| JP | 59171636 | 9/1984 |

* cited by examiner

Primary Examiner—Geoffrey L. Knable
(74) Attorney, Agent, or Firm—Nancy T. Krawczyk

(57) ABSTRACT

The present invention is directed toward an improved method of manufacturing a pneumatic tire using a bladder-less curing system. The tire is built on an associated tire building drum (26) by the layering of multiple tire components on the drum (26); one of the components is an innerliner strip (28). In accordance with the disclosed invention, the innerliner strip (28) is formed with precured regions (32). The precured regions (32) are formed by curing the innerliner strip (28) at one or more regions intermediate of the ends (30) of the strip (28). The strip (28) is applied to the tire building drum (26) and the ends (30) are spliced to one another.

10 Claims, 5 Drawing Sheets

CONTINUOUS CURED INNERLINER FOR TIRES

TECHNICAL FIELD

The present invention is directed towards the production of a tire component. More specifically, the present invention is a method of forming a precured innerliner in such a manner to facilitate later splicing and curing of the innerliner during the bladderless manufacture of a tire.

BACKGROUND ART

To better understand the advantages and improvements achieved with the present invention, a brief discussion of tire construction and building procedures follows. A pneumatic tire is typically constructed by applying various components, or plies of the tire as flat stock, upon a rotating tire building drum to form a hollow, toroidal shaped green or uncured tire. The order of applying the components is as follows: first, an innerliner is wrapped upon the tire building drum; the innerliner is followed by carcass plies containing tire reinforcement, the carcass plies are followed (not necessarily in the following order) by the beads, apexes, chafers, sidewalls, belts and tread. The components are then expanded and formed into a toroidal shaped, green tire assembly, in a manner well known in the art. The green tire assembly is then removed from the tire building drum and placed into a shaping and vulcanizing mold having the shape of the finished tire.

In the conventional manner, the mold is sealed and the toroidal shaped green tire assembly is heated and expanded radially outward into the mold periphery by injecting pressurized gas or fluid into a curing bladder mounted within the mold and disposed within the green tire assembly. As the curing bladder expands, it forces the tread and sidewalls of the green tire assembly into contact with the heated mold walls to shape and vulcanize the green tire assembly into a fully vulcanized tire. During the radial expansion of the green tire assembly within the shaping and vulcanizing mold, the toroidally shaped plies expand radially outward to dimensions beyond those of the original green tire assembly. Therefore, the bladder is usually made of an expandable elastomeric material, such as butyl rubber, which also provides resistance to the steam or hot water used to force the tire against the mold surface.

During the production of tires on an assembly line, the curing bladder within the shaping and vulcanizing mold periodically wears out or fails. The tire industry has tried to eliminate the need for a curing bladder used in tire production. U.S. Pat. No. 4,166,883 discloses a method of forming a cured tire in a mold without a bladder. Instead of a bladder, the liner functions as the impervious layer. The liner is cured or partially cured to produce a steam- and water-resistant surface before the remainder of the tire is cured in a mold. The curing or partial curing is accomplished by electron irradiation. When partially curing is desired, the entire liner is cured to a desired depth. PCT publication WO 9609161A1 discloses forming a tire by pre-vulcanizing the normal hot vapor during vulcanization.

U.S. Pat. No. 3,027,289 also discloses a method of forming a tire without the use of a building bladder during the cure cycle. In forming the tire, a strip of elastomeric material is formed into an annular band by overlapping the ends of the strip by one-fourth of an inch and then curing only the overlapped portions. U.S. Pat. No. 3,027,289 is silent about any partial precuring of the elastomeric material.

The present invention is directed toward an improved preparation method of forming a tire innerliner. The tire innerliner so formed is best suited for use in the formation of a pneumatic tire in a bladderless curing system.

SUMMARY OF THE INVENTION

The present invention is directed toward an improved method of manufacturing a pneumatic tire using a bladderless curing system. The tire is built on an associated tire building drum by the layering of tire multiple tire components on the drum; one of the components is an innerliner strip. In accordance with the disclosed invention, the innerliner strip is formed with precured regions. The precured regions are formed by curing the innerliner strip at one or more regions intermediate of the ends of the strip. The strip is applied to the tire building drum and the ends are spliced and cured to one another.

In one aspect of the present invention, the innerliner strip is formed a continuous strip of elastomeric material wherein the continuous strip is uncured at predetermined locations. The continuous strip is then cut to form an innerliner strip with intermediate precured regions. The uncured predetermined locations may extend across the width of the continuous strip, at any angle relative to the lateral edge of the continuous strip. The uncured predetermined locations may also be located along the lateral edges of the continuous strip.

In another aspect of the invention, when the uncured predetermined location extends across the width of the continuous strip, the predetermined uncured location has a width in accordance with the following equation equal to two hundred percent or less of the value of the following equation: $l=t/\tan(\beta)$; wherein l=minimum length of the predetermined uncured location, t=average thickness of the continuous strip, and $\beta$=the predetermined cutting angle.

Also disclosed is a pneumatic tire formed in a bladderless cure assembly. The tire is formed on an associated building drum by the layering of multiple tire components wherein one component is an innerliner strip. The innerliner strip is formed with precured regions. The precured regions are formed by curing the innerliner strip at one or more regions intermediate of the ends of the strip. The strip is applied to the tire building drum and the ends are spliced to one another. to one another.

In another aspect of the disclosed pneumatic tire, the innerliner splice extends at a radial angle across the inner surface of the tire.

BRIEF DESCRIPTION OF DRAWINGS

The invention will be described by way of example and with reference to the accompanying drawings in which.

DETAILED DESCRIPTION OF THE INVENTION

Figure 1:
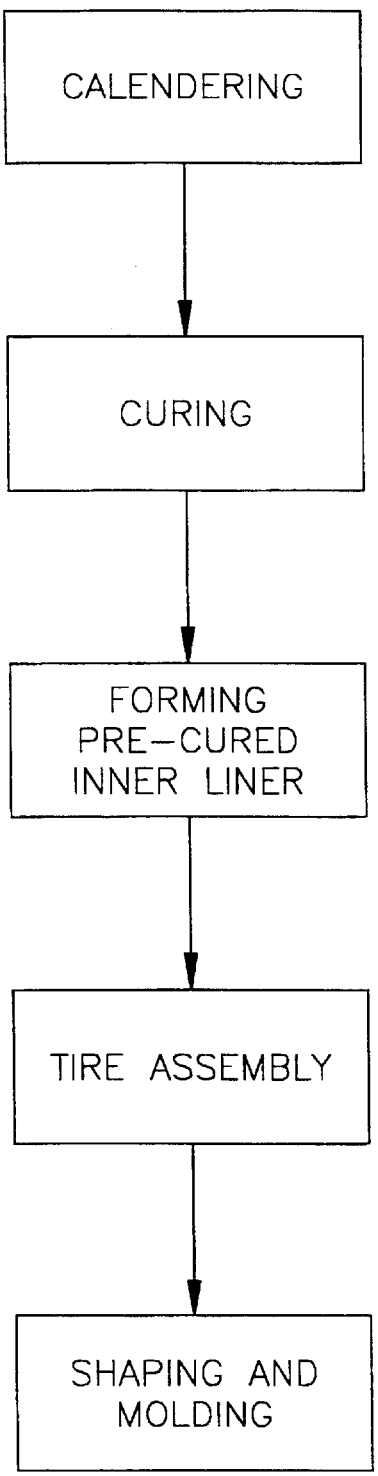
FIG. 1 is a schematic representation of the inventive process for providing a pre-cured innerliner for pneumatic tire assembly.

Referring now to the drawings wherein the showings are for purposes of illustrating a preferred embodiment of the invention only and not for purposes of limiting the same, FIG. 1 is a schematic representation of a process for forming a pneumatic tire. In one embodiment of the invention, the steps outlined in FIG. 1 are a continuous process, wherein a calendering apparatus is utilized to form a continuous strip of elastomeric material that is conveyed towards the curing means. After curing, the elastomeric material is wound onto a tire building drum to form a pre-cured innerliner. The pneumatic tire assembly is then built in a conventional manner and placed into a shaping and vulcanizing mold. In a preferred embodiment, the elastomeric material is a natural gum, although a multi-component material could be used.

The calendering apparatus used to form the continuous strip of elastomeric material may be similar to an apparatus shown and described in U.S. Pat. No. 5,762,740. In one embodiment disclosed by U.S. Pat. No. 5,762,740, the calendering apparatus includes a calender assembly having a first calender roller and a second calender roller. The first calender roller includes a profile-forming surface. The calendering apparatus includes delivery means for delivering elastomeric material to the nip between first and second calender rollers. The preferred embodiment further includes conveying means for conveying the formed continuous strip away from the calender assembly. Other known conventional calendering processes may also form the continuous strip of elastomeric material.

In forming the continuous strip of material, the material may be formed with a defined Additionally, as noted above, the strip may be a multi-component material formed by coextruding several layers together or calendering several layers together. The particular cross-section profile, the gauge, and the number of layers in the continuous strip of material will be dependant upon factors such as the type of tire in which the innerliner will be used, and the engineering specifications for the tire to be manufactured.

Figure 2:
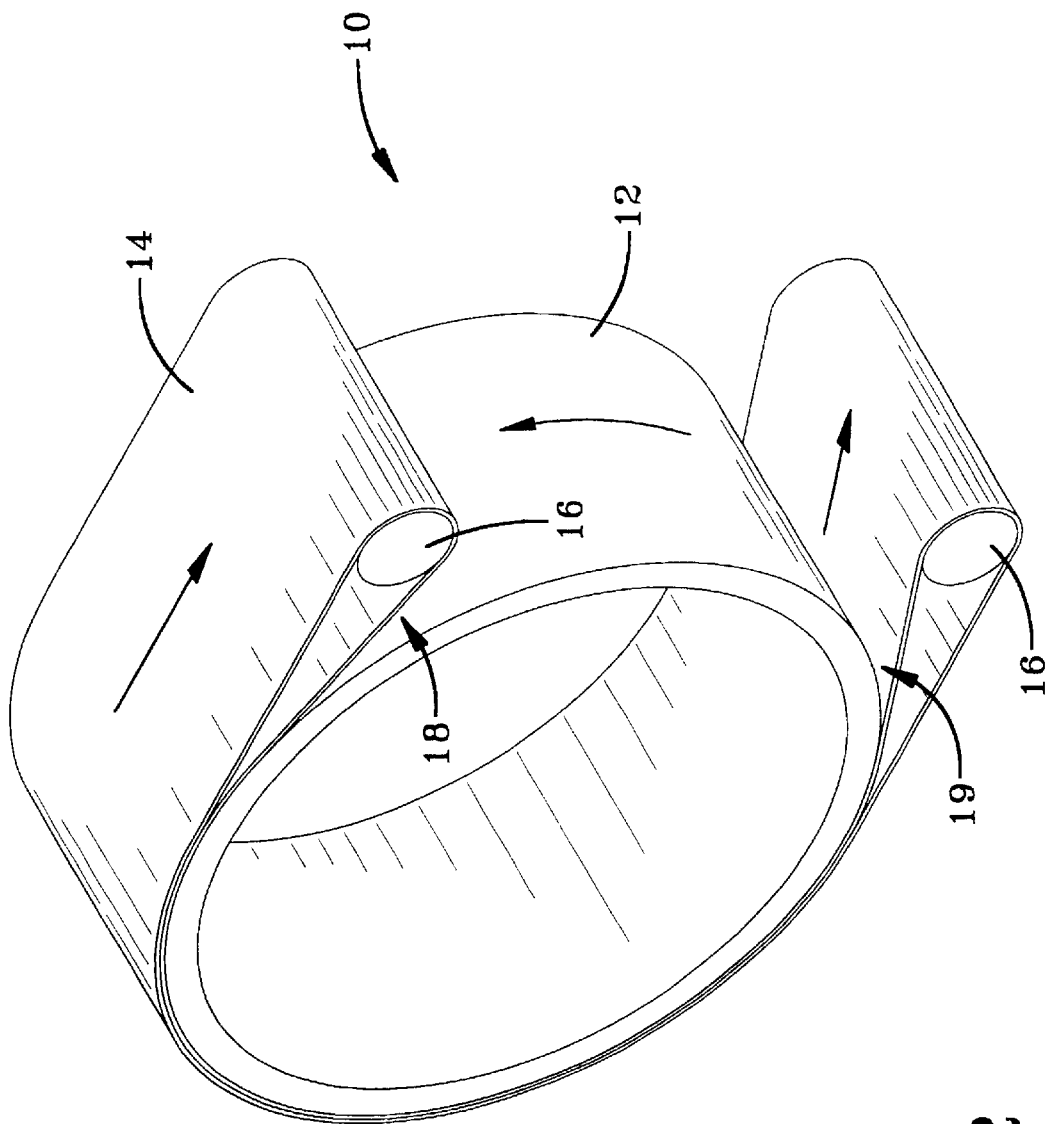
FIG. 2 is a perspective view of a rotocure drum.

After being formed, the continuous strip of elastomeric material is conveyed towards the curing means for partial curing. A first embodiment of the invention, without any illustration of means accomplish the partial curing, is generally illustrated in FIG. 2. The curing means is a rotocure unit 10 comprising a heated curing drum 12, a curing belt 14, and belt support rolls 16. The exemplary rotocure unit, for simplicity is illustrated with two rolls 16, however, it is preferred in the art to use at least three rolls to prevent the belt 14 from rubbing against itself as the belt 14 travels through the curing path. The curing belt 14 is held tightly against the curing drum 12 to apply a cure pressure to a continuous strip of elastomeric material. As the drum 12 rotates in the illustrated direction, the belt 14 travels in the same direction, driven along by the belt support rolls 16 that may be a combination of driven and non-driven rolls. Green elastomeric material enters into the rotocure 10 at a first opening 18 between the drum 12 and the curing belt 14 and cured elastomeric material exits the rotocure 10 at a second opening 19 between the drum 12 and the curing belt 14. As elastomeric material passes through the rotocure 10, the heat supplied by the drum 12 and the pressure supplied by the cuing belt 14 act to cure a continuous strip of material. After the desired curing has occurred, the continuous strip of material is cut to form an innerliner strip with opposing uncured, or green edges.

As the continuous strip of material is to be formed into a tire innerliner to be manufacture in a bladderless manufacturing method, at some time during the initial tire building process, the strip of material must be cut to form innerliner strips for splicing of the edges to form a toroidal component. In accordance with the disclosed invention, a continuous strip of elastomeric material is partially cured to facilitate easier splicing of the material to form the necessary toroidal component. To accomplish this, the curing drum 12 is provided with both heating and cooling zones to provide transitional cured-to-green sections in the continuous strip of material, as illustrated in FIGS. 3 and 4.

Figure 3:
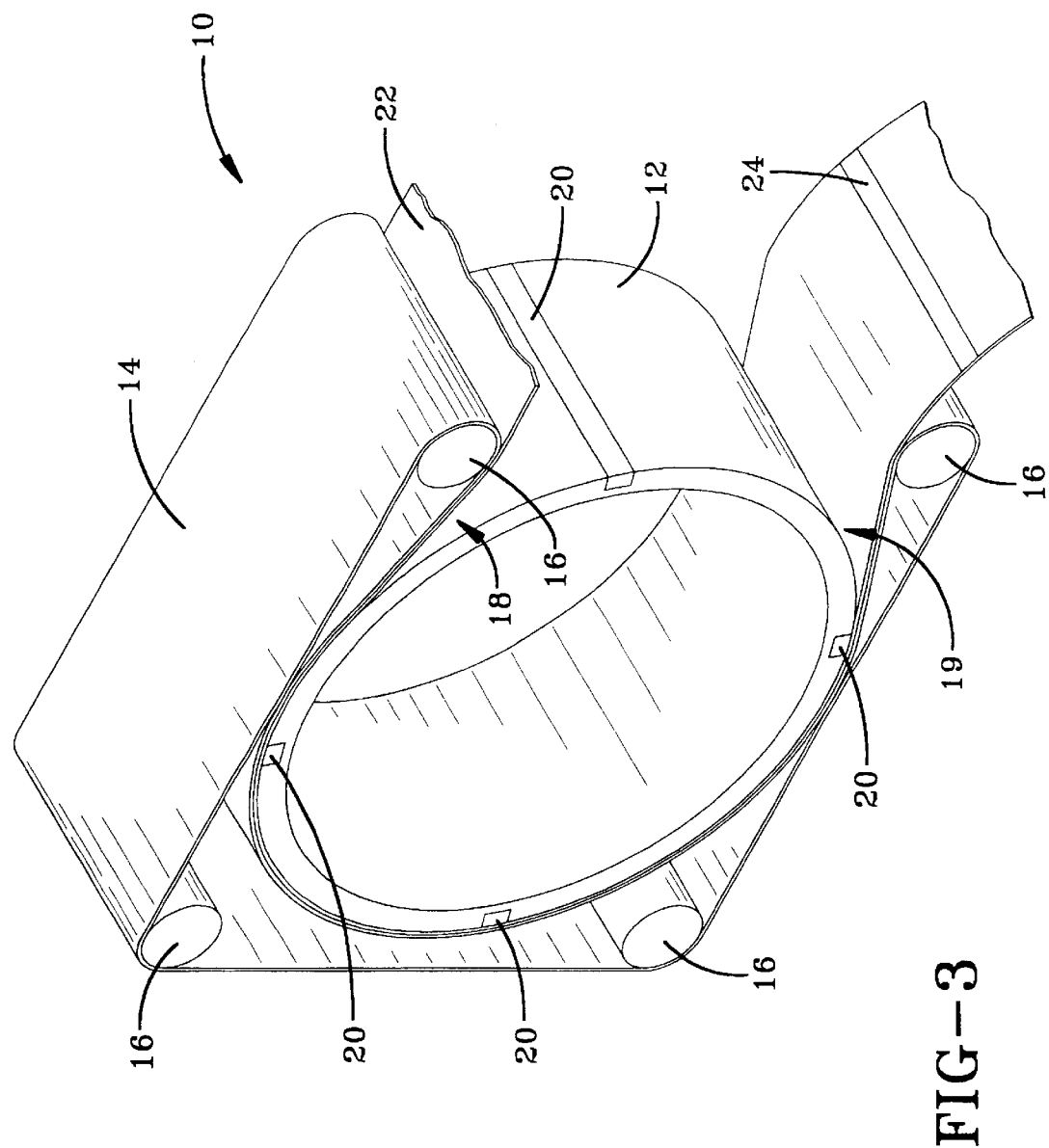
FIG. 3 is a perspective view of a first embodiment of the rotocure drum.
Figure 4:
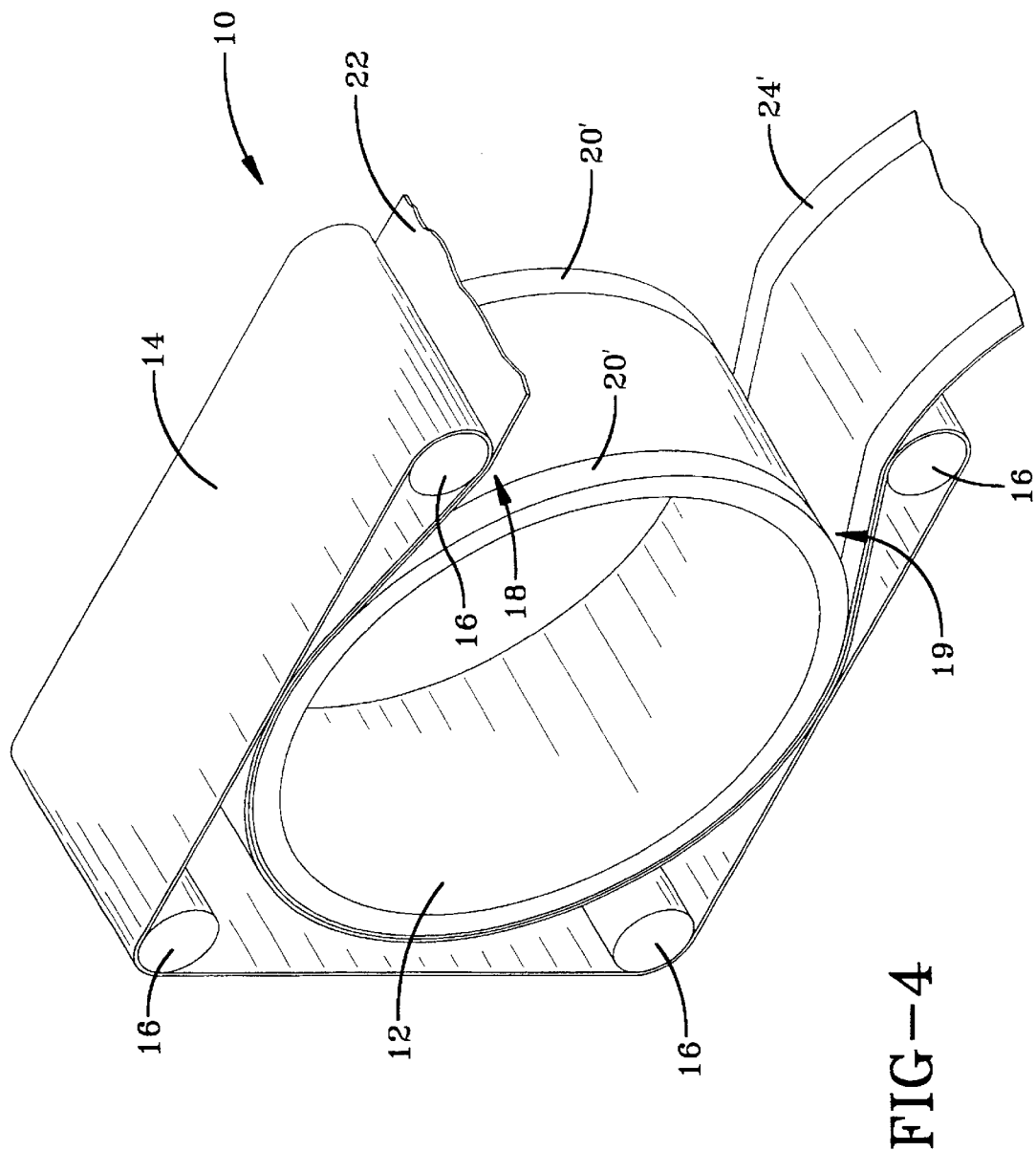
FIG. 4 is a perspective view of a second embodiment of the rotocure drum.

In one embodiment of the rotocure unit 10, the drum 12 has cooling zones 20 extending across the width of the drum 12 at fixed locations, see FIG. 3. In this embodiment, the continuous strip of elastomeric martial 22 has a width approximately equal to the width of the innerliner component to be formed. The cooling zones 20 are formed at equal distances the innerliner component to be formed. The cooling zones 20 are formed at equal distances along the circumference of the drum 12. The continuous strip of elastomeric material 22 enters the rotocure unit 10 at the entry point 18, and travels between the curing drum 12 and the curing belt 14 to exit the unit 10 at the exit point 19. The material 22 is cured except in predetermined portions 24 that are adjacent to the cooling zones 20 as the material 22 travels through the unit 10. The partially cured continuous strip of material 22 is then cut in the predetermined uncured portions 24 to form discrete strips 28 (see FIG. 5) with opposing uncured ends 30 and an intermediate region 32 which are then spliced together to form the toroidal innerliner tire component.

For illustration purposes, the drum 12 has four equally spaced cooling zones 20. The drum 12 may have only one cooling zone 20, or as many as possible, depending upon the permissible drum diameter. The number of cooling zones 20 on the drum 12, the circumference of the curing drum 12, the curing conditions present in the rotocure, and the circumference of the toroidal components to be formed from the continuous strip of elastomeric material 22 are interrelated factors which determine the configuration of the curing drum 12 and the cooling zones 20. The circumference of the drum 12 may be determined by multiplying the circumference of the innerliner component to be formed plus twice the splice length by a whole number integer; the integer is equal to the number of cooling zones 20. This relationship is expressed by the equation:

$$Dc = (Tc + 2Lc) * n$$

wherein Dc is the drum circumference, Tc is the toroidal component circumference, Lc is the length of the cooling zone 20, and n is the number of cooling zones 20. Since the continuous strip of elastomeric material 22 enters the drum 12 uncured and exits the drum 12 cured, except for the intentionally uncured, or green, portions 24, the circumference of the drum 12 must also be sufficient to permit the continuous strip of material 22 to be cured under the conditions present within the rotocure 10, i.e., the given belt pressure, curing temperature, and drum speed. These conditions are adjusted to achieve the required curing, and would be within the knowledge of those skilled in the art to determine the optimum conditions for each continuous strip 22 being cured in the rotocure 10. These conditions may also change depending upon the characteristics of the sheet 22 being cure, i.e., the sheet gauge, any varying contours, and the composition of the sheet 22.

The cooling zones 20 may also be formed at an inclined angle across the curing drum 12. In such a construction, the above relationships are still present and determinative of the drum configuration. Such an inclination of the cooling zone 20 ultimately produces an configuration permits an innerliner splice that extends across the inner surface of the tire at an inclination and places potential stress points in the shoulder regions at different circumferential locations of the tire.

The width of the cooling zone 20 formed on the drum 12 is dependent upon the cooling method used, and the desired width of the uncured portion 24 of the continuous strip of elastomeric material 22. The cooling zone 20 may be formed by forming a step-down portion in the drum surface. When the cooling zone 20 is formed in this manner, as the continuous strip of elastomeric material 22 passes over the cooling zone 20, the material 22 is not subjected to any direct application of heat. As the heat being applied by the remainder of the drum 12 to the continuous strip of elastomeric material 22 may begin curing of the desired intentionally uncured portions 24, the step-down cooling zone may need to be formed of a width greater than the width of the intentionally uncured portions 24.

Cooling zones 20 may also be formed from materials that have different heat properties that the remaining portion of the drum 12. Such materials should be able to remain cooler than the remaining portion of the drum 12. Other methods of forming cooling zones 20 will be evident to those of skill in the art.

An alternative method to forming cooling zones 20 on the surface of the drum 12 is to provide for the insertion, between the drum 12 and elastomeric material 22, of a bar which prevents the heat of the drum 12 from curing the elastomeric material 22. The bar should be formed of material that does not readily increase in temperature. As the elastomeric material 22 exits the rotocure unit 10, the cooling bars would either be reinserted between the drum 12 and entering strip of material 22 or be temporarily set aside to return the bars to an ambient temperature.

As stated above, the width of the cooling zone 20 is also dependent upon the desired width of the uncured portion of the continuous strip of elastomeric material 22. And the width of the cooling zone 20 is dependent upon the splicing method to be used when forming the cut strips 28 into the toroidal component. If the innerliner is to be formed by lap splicing, then the width of the uncured portion 24 should be at least equal to twice the length of the splice, so that the cutting in the middle of the uncured portion 24 of the continuous strip 22 will form an innerliner strip 28 with equal width uncured ends 30.

The continuous sip of material 22 may also be cut at an angle to provide for angled lap splicing. In this splicing technique, the uncured portions 24 are cut at a splice angle B, relative to the material surface, ranging from 0° to 85°, with the most preferred angle being at least 80°. The width of the uncured portion 24 is at least equal to the following equation: uncured portion 24 is at least equal to the following equation:

$$l=t/\tan(\beta)$$

wherein l=minimum length of the uncured region, t=average thickness of the continuous strip 22, and β=the predetermined cutting angle. It has been found that providing a splice angle of at least 80° provides a large surface area for the splice that provides advantages over butt splices or splices made with smaller surface areas.

The cooling zones 20' formed on the curing drum 12 may also be formed along the outside edges of the cure drum 12, as illustrated in FIG. 4. In this embodiment, the width of the continuous strip of material 22 being fed into the rotocure 10 is about equal to the circumference of either the innerliner hoop to be formed or the tire building drum 26. The continuous strip of material 22 is partially cured in a manner substantially similar to that described above. Upon cutting across the width of the continuous strip of material 22, the innerliner strip 28 is rotated to bring the uncured edges 30 together for splicing to form the toroidal innerliner component.

Using the drum 12 illustrated in FIG. 4 is better suited to forming innerliner which are uniform in thickness. If the innerliner is to a varying profile across the width of the final toroidal innerliner component, then the drum 12 illustrated in FIG. 3 is better suited as the outer profile of the drum 12 and the curing belt 14 may be shaped to correspond to any desired varying innerliner profile, such as those disclosed in U.S. Pat. No. 5,762,740.

As noted above, after the continuous strip has been partially cured in the rotocure unit 10, the continuous strip 22 is cut to form innerliner strips 28. The uncured portions 24' along the edges of the strips are then prepared for splicing. If the innerliner strip 28 is to be lapped spliced, then no edge preparation may be necessary. However, if it is desired to have an angled lap splice, the edges 24', 30 must be prepared by trimming the edges 24', 30 to have the desired angle. As above, the splice angle β ranges from 0° to 85°, with the most preferred angle being at least 80°.

The cooling zones 20' along the edges of the curing drum 12 may be formed similarly to the lateral cooling zones 20 as discussed above. The edge cooling zones 20' may be formed by forming a step-down portion in the drum surface. When the cooling zone 20' is formed in this manner, as the continuous strip of elastomeric material 22 travels through the unit 10, the edges of the material 24' are not subjected to any direct application of heat. As the heat being applied by the remainder of the drum 12 to the continuous strip of elastomeric material 22 may begin curing of the desired intentionally uncured portions 24', the step-down cooling zone may need to be formed of a width greater than the width of the intentionally uncured portions 24'.

Cooling zones 20' may also be formed from materials that have different heat properties that the remaining portion of the drum 12. Such materials should be able to remain cooler than the remaining portion of the drum 12. Other methods of forming cooling zones 20' will be evident to those of skill in the art.

An alternative construction to the disclosed rotocure unit 10 is the use of a conventional platen press that has been modified to have cool zones 20, 20' to achieve the inventive selective curing. The cool zones 20, 20' may be formed as either lateral, inclined lateral, or edge cooling zones as disclosed above.

An alternative to the cooling zones 20' along the edges of the curing drum 12 or the platen press is to form the innerliner strips from a modified continuous strip of elastomeric material 22. When forming the elastomeric material 22, the edge portions of the continuous strip 22 may be compounded with a slower curing package that the central portion of the continuous strip 22. The base constituents of the compound comprising the edge and central portions of the continuous strip are selected to be identical. By using a slower cure package in the edges, neither the drum 12 nor the platen press need be modified in any of the methods discussed above.

An embodiment applicable to all of the above disclosed methods of forming a selectively cured innerliner sheet is that for the cured portion of the continuous sheet, only a selective depth of the continuous sheet may be cured. This yields a continuous sheet with selected uncured regions 24, 24' and the remainder of the sheet has a cured side and an uncured side. After cutting the continuous strip 22 into selective innerliner strips 28, the cured side is placed adjacent to the building drum 26, and the uncured side is placed facing outwards in preparation for being adjacent to the first carcass layer applied to the drum 26.

Figure 5:
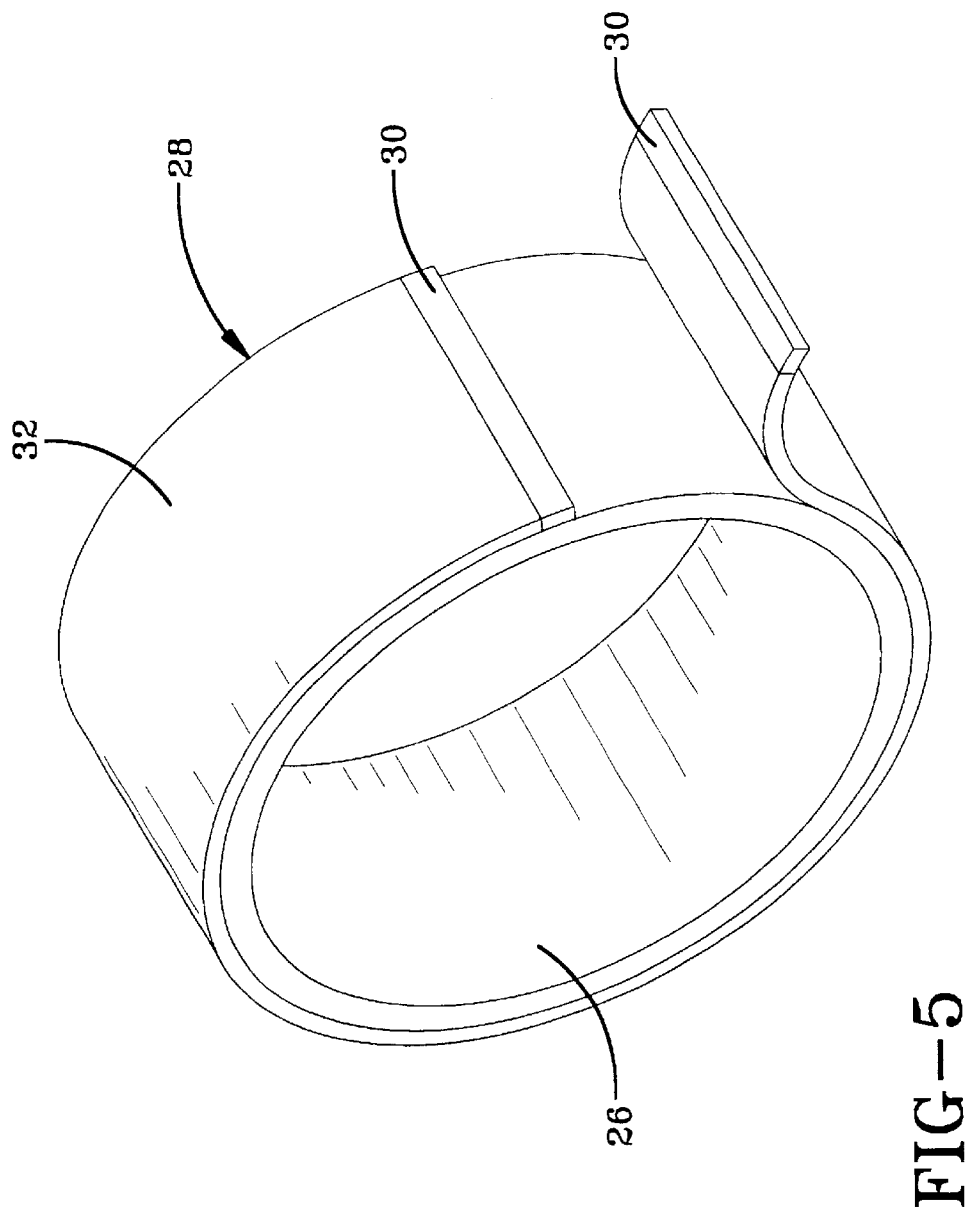
FIG. 5 is a perspective view of a simplified building drum with an innerliner strip formed in accordance with the present invention.

An important aspect of the present invention is the use of a pre-cured innerliner in the tire forming process in order to eliminate the need for an inflatable bladder in an associated tire forming and vulcanizing mold. In an exemplary description of the building of a tire assembly on a tire building drum 26, the cut innerliner strip 28 is wound onto the building drum 26, as illustrated in FIG. 5 (the building drum 26 is simplified for illustrative purposes). The uncured edges 30 of the innerliner are spliced together and cured to form the continuous innerliner. A body ply is run onto the drum 26 over the innerliner, cut and stitched onto itself, as typically applied in the tire building art. As needed, additional carcass plies, followed by the tire beads, apexes, chafers, sidewalls, belts, and a tire tread ply are added. The majority of the carcass materials, with the exception of the innerliner, are comprised of green, uncured rubber and can be stitched together by any conventional techniques and means. The building drum 26 is utilized in the usual manner to provide a toroidally shaped green tire assembly that is then removed to a shaping and vulcanizing mold.

The shaping and vulcanizing mold preferably does not require the use of a curing bladder to form a complete pneumatic tire. The mold is constructed in any conventional manner and does not form a part of the present invention. The cured innerliner formed from the present invention as described above forms the inner surface of the tire assembly and is impervious to pressurized gas, steam, or hot water. The pressurized gas, steam or hot water is introduced into the mold to provide sufficient pressure within the tire assembly to force it against the mold wall and the innerliner against the tire carcass so as to form a tread pattern in the tread portion and form any desired identification and indicia marks desired on the tire's surface. The tire assembly is then cured and removed from the mold in the form of a completed tire. During this process, the innerliner is stretched to its final toroidal shape.

The present invention permits the preparation of a pneumatic tire innerliner that is more manufacture-friendly in that the innerliner is not preformed a tube prior to the application of the innerliner to the building drum 26, as is conventionally applied. Also, when forming the continuous strip with uncured edges 24', the continuous innerliner sheet 22 may be used in a variety of tire sizes, the final diameter of the innerliner strip 28 formed being dependent upon how much of the continuous strip 22 is cut for the innerliner.

What is claimed is:

1. In a method for manufacturing a pneumatic tire using bladderless cure, the method comprising building a tire on an associated tire building drum by the layering of multiple tire components on the drum wherein one component is an innerliner strip (28), and curing the tire in an associated bladderless shaping and vulcanizing mold, wherein the innerliner strip (28) is formed with precured regions (32), the improvement being characterized by:
   prior to applying the innerliner strip (28) to the tire building drum (26), curing the innerliner strip (28) at one or more regions (32) intermediate of uncured ends (30) of the strip (28) to form the precured regions (32),
   applying the strip (28) to the building drum (26), and
   splicing the uncured ends (30) of the strip (28) to one another.

2. In a method for manufacturing a pneumatic tire in accordance with claim 1 wherein the method is further characterized by forming the innerliner strip (28) from a continuous strip of elastomeric material (22) wherein the continuous strip (22) is cured with selective predetermined uncured locations (24, 24') and then the continuous strip (22) is cut to form the innerliner strip (28) with intermediate precured locations (32) and uncured ends (30).

3. In a method for manufacturing a pneumatic tire in accordance with claim 2 wherein the method is further characterized by the predetermined uncured locations (24) extending across the width of the continuous strip (22).

4. In a method for manufacturing a pneumatic tire in accordance with claim 3 wherein the method is further characterized by the predetermined uncured locations (24) extending across the width of the continuous strip (22) at an inclined angle relative to the lateral edges of the continuous strip (22).

5. In a method for manufacturing a pneumatic tire in accordance with claim 3, the method being further characterized by cutting the continuous strip (22) in the predetermined uncured locations (24) at a splice angle to form the innerliner uncured strip ends (30) and wherein each predetermined uncured location (24), prior to cutting of the continuous strip (22), has a length at least equal to l, l being defined in the following equation:

$$l=t/\tan(\beta)$$

wherein l=minimum length of the predetermined uncured location (24), t=average thickness of the continuous strip (22), and β=the predetermined splice cutting angle, relative to the material surface, the length of the predetermined uncured location (24) being measured parallel to the length of the continuous strip (22).

6. In a method for manufacturing a pneumatic tire in accordance with claim 2 wherein the method is further characterized by forming the predetermined uncured locations (24) along the lateral edges of the continuous strip of elastomeric material (22).

7. In a method for manufacturing a pneumatic tire using bladderless cure, the method comprising building a tire on an associated tire building drum by the layering of multiple tire components on the drum wherein one component is an innerliner strip (28), and curing the tire in an associated bladderless shaping and vulcanizing mold, wherein the innerliner strip (28) is formed with precured regions (32), the improvement being characterized by:
   prior to applying the innerliner strip (28) to the tire building drum (26), curing the innerliner strip (28) at one or more regions (32) to a full depth of the strip,
   the regions (32) being intermediate of uncured ends (30) of the strip (28) to form the precured regions (32),
   applying the strip (28) to the building drum (26), and
   splicing the uncured ends (30) of the strip (28) to one another.

8. In a method for manufacturing a pneumatic tire using bladderless cure, the method comprising building a tire on an associated tire building drum by the layering of multiple tire components on the drum wherein one component is an innerliner strip (28), and curing the tire in an associated bladderless shaping and vulcanizing mold, wherein the innerliner strip (28) is formed with precured regions (32), the improvement being characterized by:
   prior to applying the innerliner strip (28) to the tire building drum (26), forming the innerliner strip (28) from a continuous strip of elastomeric material (22) by curing the continuous strip (22) with selective predetermined uncured locations (24, 24') having a defined length relative to the length of the continuous strip extending across the width of the continuous strip (22), cutting the continuous strip (22) to form the innerliner strip (28) with intermediate precured locations (32) and uncured ends (30);

applying the strip (28) to the building drum (26); and splicing the uncured ends (30) of the strip (28) to one another.

9. In a method for manufacturing a pneumatic tire in accordance with claim 8 wherein the method is further characterized by the predetermined uncured locations (24) extending across the width of the continuous strip (22) at an inclined angle relative to the lateral edges of the continuous strip (22).

10. In a method for manufacturing a pneumatic tire in accordance with claim 8, the method being further characterized by cutting the continuous strip (22) in the predetermined uncured locations (24) at a splice angle to form the innerliner uncured strip ends (30) and wherein each predetermined uncured location (24), prior to cutting of the continuous strip (22), has a length at least equal to l, l being defined in the following equation:

$$l = t/\tan(\beta)$$

wherein l=minimum length of the predetermined uncured location (24), t=average thickness of the continuous strip (22), and $\beta$=the predetermined splice cutting angle, relative to the material surface, the length of the predetermined uncured location (24) being measured parallel to the length of the continuous strip (22).

* * * * *